United States Patent
Liu et al.

(10) Patent No.: US 9,426,130 B2
(45) Date of Patent: Aug. 23, 2016

(54) METHODS, DEVICES AND SYSTEMS FOR ANTI-COUNTERFEITING AUTHENTICATION

(71) Applicant: Xiaomi Inc., Beijing (CN)

(72) Inventors: Wei Liu, Beijing (CN); Ji Ma, Beijing (CN); Sen Ma, Beijing (CN); Liang Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/641,569

(22) Filed: Mar. 9, 2015

(65) Prior Publication Data

US 2016/0021067 A1  Jan. 21, 2016

Related U.S. Application Data

(63) Continuation of application No. PCT/CN2014/091426, filed on Nov. 18, 2014.

(30) Foreign Application Priority Data

Jul. 21, 2014 (CN) .......................... 2014 1 0348001

(51) Int. Cl.
 G06K 5/00 (2006.01)
 H04L 29/06 (2006.01)
 H04W 12/06 (2009.01)

(52) U.S. Cl.
 CPC ............ H04L 63/0428 (2013.01); H04L 63/08 (2013.01); H04W 12/06 (2013.01)

(58) Field of Classification Search
 CPC ........... G06K 5/00; G06K 7/08; G06K 19/06; G06F 17/00; H04L 9/32; H04L 29/06
 USPC .......... 235/380, 375, 492, 449, 487; 713/168, 713/155, 178
 See application file for complete search history.

(56) References Cited

U.S. PATENT DOCUMENTS

2003/0056097 A1* 3/2003 Araki .................... H04L 63/083
                                                              713/168
2003/0114144 A1* 6/2003 Minemura .............. G06F 21/51
                                                              455/410

(Continued)

FOREIGN PATENT DOCUMENTS

CN          1582016      2/2005
CN        101034985      9/2007

(Continued)

OTHER PUBLICATIONS

International Search Report of PCT/CN2014/091426, mailed from the State Intellectual Property Office of China on May 6, 2015.

(Continued)

*Primary Examiner* — Edwyn Labaze
(74) *Attorney, Agent, or Firm* — Finnegan, Henderson, Farabow, Garrett & Dunner LLP

(57) ABSTRACT

An anti-counterfeiting authentication method is provided. The method includes: generating an encrypted message corresponding to an i-th authentication step, wherein the i-th authentication step is one of n authentication steps arranged in a predetermined order, and $1 \leq i \leq n$; sending the encrypted message to a terminal device; receiving, from the terminal device, a call request for initiating the i-th authentication step; executing the i-th authentication step if the request is initiated based on the encrypted message; if the i-th authentication step succeeds and i is less than n, increasing i by one and repeating the generating of an encrypted message; if the i-th authentication step fails, sending an indication to the terminal device indicating an authentication failure; and if the i-th authentication step succeeds and i equals to n, sending an indication to the terminal device indicating an authentication success.

22 Claims, 11 Drawing Sheets

(56) References Cited

U.S. PATENT DOCUMENTS

| | | | | |
|---|---|---|---|---|
| 2005/0193206 | A1* | 9/2005 | Kunisa | H04L 9/3247 713/176 |
| 2007/0067631 | A1* | 3/2007 | Westhoff | H04L 9/3242 713/168 |
| 2007/0228166 | A1 | 10/2007 | Lui | |
| 2008/0179390 | A1 | 7/2008 | Harjani | |
| 2009/0225985 | A1* | 9/2009 | Dolev | H04L 9/0656 380/270 |
| 2009/0314841 | A1* | 12/2009 | Tomoeda | G06F 21/31 235/492 |
| 2010/0131755 | A1* | 5/2010 | Zhu | H04L 63/0815 713/155 |
| 2011/0107100 | A1 | 5/2011 | Løken d.y. | |
| 2012/0233461 | A1* | 9/2012 | Takahashi | H04L 9/3271 713/168 |
| 2012/0284514 | A1 | 11/2012 | Lambert | |
| 2012/0331298 | A1 | 12/2012 | Xu et al. | |

FOREIGN PATENT DOCUMENTS

| | | |
|---|---|---|
| CN | 101236677 | 8/2008 |
| CN | 101388767 | 3/2009 |
| CN | 101777105 | 7/2010 |
| CN | 101945104 | 1/2011 |
| CN | 102004986 | 4/2011 |
| CN | 102013979 | 4/2011 |
| CN | 102147884 | 8/2011 |
| CN | 103903146 | 7/2014 |
| RU | 2310227 C2 | 11/2007 |
| RU | 2501084 C2 | 12/2013 |
| RU | 2518680 C2 | 6/2014 |
| WO | WO 2014/105310 A1 | 7/2014 |

OTHER PUBLICATIONS

European Search Report for Application No. 15177287.8, from the European Patent Office, dated Nov. 30, 2015.

Keith Mainwaring, "Draft Technical Report on Counterfeiting," WD 6, ITU-T Draft, Study Period 2013-2016, International Telecommunication Union, Geneva, CH, vol. 8/11, dated Feb. 20, 2014.

English version of International Search Report for Application No. PCT/CN2014/091426, dated May 6, 2015, 2 pages.

Russian Office Action for Russian Application No. 2015108340, mailed Apr. 13, 2016 (17 pages).

* cited by examiner

METHODS, DEVICES AND SYSTEMS FOR ANTI-COUNTERFEITING AUTHENTICATION

CROSS-REFERENCE TO RELATED APPLICATIONS

This application is s a continuation of International Application No. PCT/CN2014/091426, filed Nov. 18, 2014, which is based upon and claims priority to Chinese Patent Application No. 201410348001.5, filed Jul. 21, 2014, the entire contents of all of which are incorporated herein by reference.

TECHNICAL FIELD

The present disclosure generally relates to the field of terminal devices and, more particularly, to methods, devices, and systems for anti-counterfeiting authentication.

BACKGROUND

Along with the popularization of mobile phones, tablet PCs, smart televisions and the like, a large amount of counterfeit devices appear on the market. These counterfeit devices often confuse users in terms of appearance and operating systems. It is often difficult for users to distinguish genuine products from the counterfeiting products.

In conventional anti-counterfeiting authentication methods, an application program may be downloaded and installed in a terminal device that is to be authenticated. The application program may conduct anti-counterfeiting authentication of the terminal device. The application program may acquire configuration parameters and performance parameters of the terminal device, and then match them with configuration parameters and performance parameters stored in a database. The terminal device may be determined as a genuine product if the acquired parameters of the terminal device match the stored parameters in the database. Otherwise the terminal device may be determined as a counterfeit product.

SUMMARY

According to a first aspect of the present disclosure, there is provided an anti-counterfeiting authentication method, comprising: generating an encrypted message corresponding to an i-th authentication step, wherein the i-th authentication step is one of n authentication steps arranged in a predetermined order, and $1 \le i \le n$; sending the encrypted message to a terminal device; receiving, from the terminal device, a call request for initiating the i-th authentication step; executing the i-th authentication step if the request is initiated based on the encrypted message; if the i-th authentication step succeeds and i is less than n, increasing i by one and repeating the generating of an encrypted message; if the i-th authentication step fails, sending an indication to the terminal device indicating an authentication failure; and if the i-th authentication step succeeds and i equals to n, sending an indication to the terminal device indicating an authentication success.

According to a second aspect of the present disclosure, there is provided an anti-counterfeiting authentication method, comprising: receiving, from a server, an encrypted message corresponding to an i-th authentication step, wherein the i-th authentication step is one of n authentication steps arranged in a predetermined order, and $1 \le i \le n$; sending, to the server, a call request for initiating the i-th authentication step, based on the encrypted message; and receiving, from the server, an indication indicating an authentication failure or an authentication success.

According to a third aspect of the present disclosure, there is provided an anti-counterfeiting authentication device, comprising: a processor; and a memory for storing instructions executable by the processor. The processor is configured to: generate an encrypted message corresponding to an i-th authentication step, wherein the i-th authentication step is one of n authentication steps arranged in a predetermined order, and $1 \le i \le n$; send the encrypted message to a terminal device; receive, from the terminal device, a call request for initiating the i-th authentication step; execute the i-th authentication step if the call request is initiated based on the encrypted message; if the i-th authentication step succeeds and i is less than n, increase i by one and repeat the generating of an encrypted message; if the i-th authentication step fails, send an indication to the terminal device indicating an authentication failure; and if the i-th authentication step succeeds and i equals to n, send an indication to the terminal device indicating an authentication success.

According to a fourth aspect of the present disclosure, there is provided an anti-counterfeiting authentication device, comprising: a processor; and a memory for storing instructions executable by the processor. The processor is configured to: receive, from a server, an encrypted message corresponding to an i-th authentication step, wherein the i-th authentication step is one of n authentication steps arranged in a predetermined order, and $1 \le i \le n$; send, to the server, a call request for initiating the i-th authentication step, based on the encrypted message; and receive, from the server, an indication indicating an authentication failure or an authentication success.

According to a fifth aspect of the present disclosure, there is provided a non-transitory computer-readable storage medium having stored therein instructions that, when executed by a processor of a server, cause the server to perform an anti-counterfeiting authentication method comprising: generating an encrypted message corresponding to an i-th authentication step, wherein the i-th authentication step is one of n authentication steps arranged in a predetermined order, and $1 \le i \le n$; sending the encrypted message to a terminal device; receiving a call request sent from the terminal device for initiating the i-th authentication step; executing the i-th authentication step if the call request is initiated based on the encrypted message; if the i-th authentication step succeeds and i is less than n, increasing i by one, and repeating the generating of an encrypted message; if the i-th authentication step fails, sending an indication to the terminal device indicating an authentication failure; and if the i-th authentication step succeeds and i equals to n, sending an indication to the terminal device indicating an authentication success.

According to a sixth aspect of the present disclosure, there is provided a non-transitory computer-readable storage medium having stored therein instructions that, when executed by a processor of a terminal device, cause the terminal device to perform an anti-counterfeiting authentication method comprising: receiving, from a server, an encrypted message corresponding to an i-th authentication step, wherein the i-th authentication step is one of n authentication steps arranged in a predetermined order, and $1 \le i \le n$; sending, to the server, a call request for initiating the i-th authentication step, based on the encrypted message; and receiving, from the server, an indication indicating an authentication failure or an authentication.

It is to be understood that both the foregoing general description and the following detailed description are exemplary rather than limiting the present disclosure.

BRIEF DESCRIPTION OF THE DRAWINGS

The accompanying drawings, which are incorporated in and constitute a part of this specification, illustrate embodiments consistent with the invention and serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The following exemplary embodiments and description thereof intend to illustrate, rather than to limit, the present disclosure. Hereinafter, the present disclosure will be described with reference to the drawings.

Figure 1:
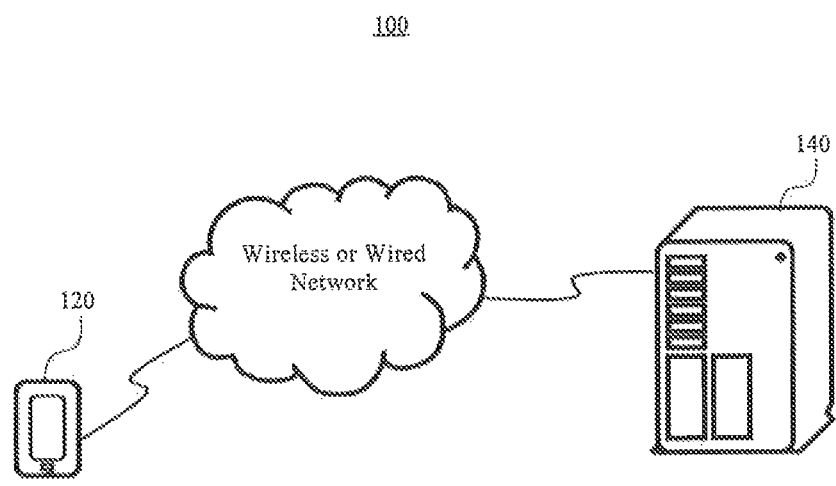
FIG. 1 is a schematic diagram showing a system environment, according to an exemplary embodiment.

FIG. 1 is a schematic diagram showing a system environment 100, according to an exemplary embodiment. Referring to FIG. 1, the system environment 100 includes a terminal device 120 to be authenticated and a server 140.

The terminal device 120 to be authenticated may be a mobile phone, a tablet computer, an ebook reader, a Moving Picture Experts Group Audio Layer III (MP3) player, a Moving Picture Experts Group Audio Layer IV (MP4) player, a smart television and the like.

The terminal device 120 is connected to the server 140 through a wired network or a wireless network.

The server 140 may be a server, or a server cluster including a plurality of servers, or a cloud computing service center.

In exemplary embodiments, anti-counterfeiting authentication methods described below may be performed by the terminal device 120 to be authenticated.

In other embodiments, the anti-counterfeiting authentication methods may be performed by other terminal equipment connected to the terminal device 120. For example, the anti-counterfeiting authentication methods may be performed by a computer, which is connected to the terminal device 120 through a Universal Serial Bus (USB) data line, a wired network or a wireless network for acquiring information relating to the terminal device 120.

Figure 2:
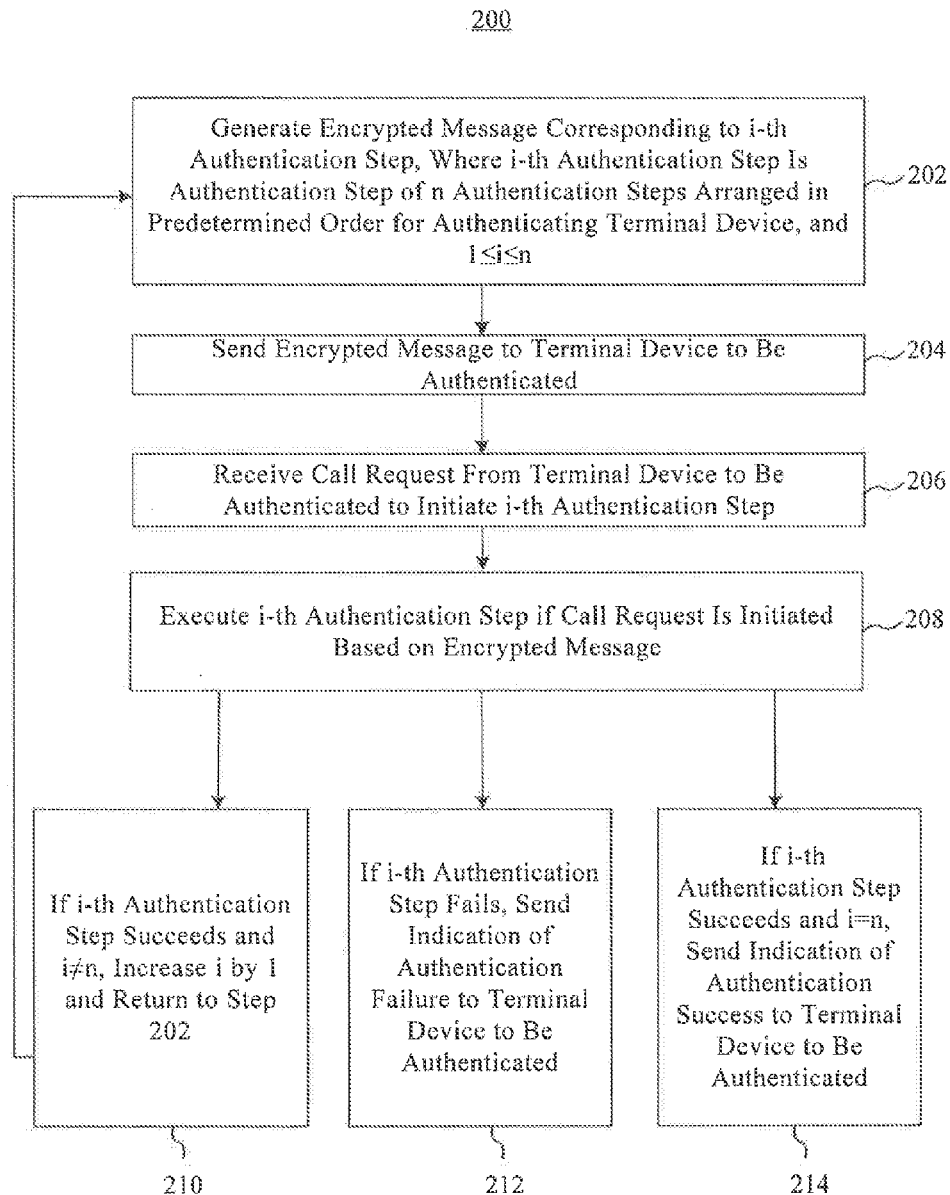
FIG. 2 is a flowchart of an anti-counterfeiting authentication method, according to an exemplary embodiment.

FIG. 2 is a flowchart of an anti-counterfeiting authentication method 200, according to an exemplary embodiment. For example, the method 200 may be performed by a server. Referring to FIG. 2, the anti-counterfeiting authentication method 200 may include the following steps.

In step 202, the server generates an encrypted message corresponding to an i-th authentication step, where the i-th authentication step is an authentication step of n authentication steps arranged in a predetermined order for authenticating a terminal device, and $1 \leq i \leq n$.

In step 204, the server sends the encrypted message to the terminal device that is to be authenticated.

In step 206, the server receives from the terminal device to be authenticated a call request for initiating the i-th authentication step. For example, the call request is configured to request calling of a set of instructions for initiating the i-th authentication step.

In step 208, if the call request is initiated based on the encrypted message sent to the terminal device, the server executes the i-th authentication step.

In step 210, if the i-th authentication step succeeds in authentication and $i \neq n$, the server increases i by 1, i.e., $i=i+1$, and returns to step 202 to generate an encrypted message corresponding to a new i-th authentication step.

In step 212, if the i-th authentication step fails, the server sends an indication of authentication failure to the terminal device to be authenticated.

In step 214, if the i-th authentication step succeeds and $i=n$, the server sends an indication of authentication success to the terminal device to be authenticated.

Since the i-th authentication step is executed upon receiving a call request initiated based on an encrypted message corresponding to the i-th authentication step, a counterfeit terminal device would not meet conditions for triggering and executing the i-th authentication step, thereby improving the authentication success rate.

Figure 3:
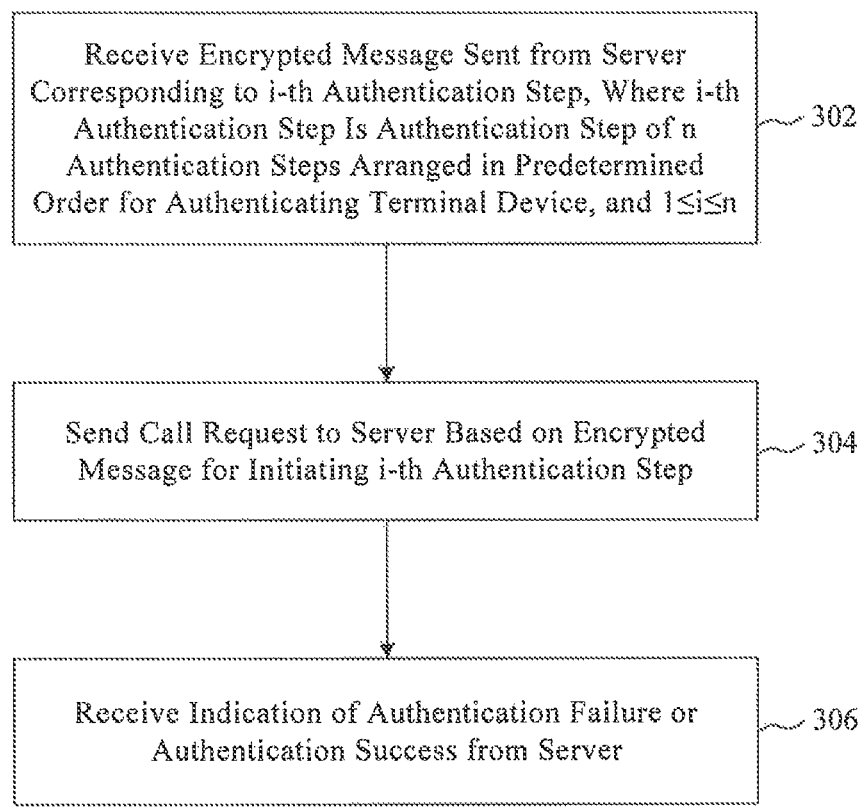
FIG. 3 is a flowchart of an anti-counterfeiting authentication method, according to an exemplary embodiment.

FIG. 3 is a flowchart of an anti-counterfeiting authentication method 300, according to another exemplary embodiment. For example, the method 300 may be performed by a terminal device to be authenticated or other terminal equipment connected to the terminal device to be authenticated. Referring to FIG. 3, the method 300 may include following steps.

In step 302, the terminal device receives an encrypted message sent from a server corresponding to an i-th authentication step, where the i-th authentication step is an authentication step of n authentication steps arranged in a predetermined order for authenticating the terminal device, and $1 \leq i \leq n$.

In step 304, the terminal device sends a call request for initiating the i-th authentication step to the server, based on the encrypted message. For example, the call request is configured to request calling of a set of instructions for initiating the i-th authentication step.

In step 306, the terminal device receives an indication indicating an authentication failure or an authentication success from the server.

Since a counterfeit client application cannot meet conditions for triggering and executing the i-th authentication step, the method 300 improves the authentication success rate by requiring the terminal device to send a call request to the server based on the encrypted message for initiating the i-th authentication step.

Figure 4:
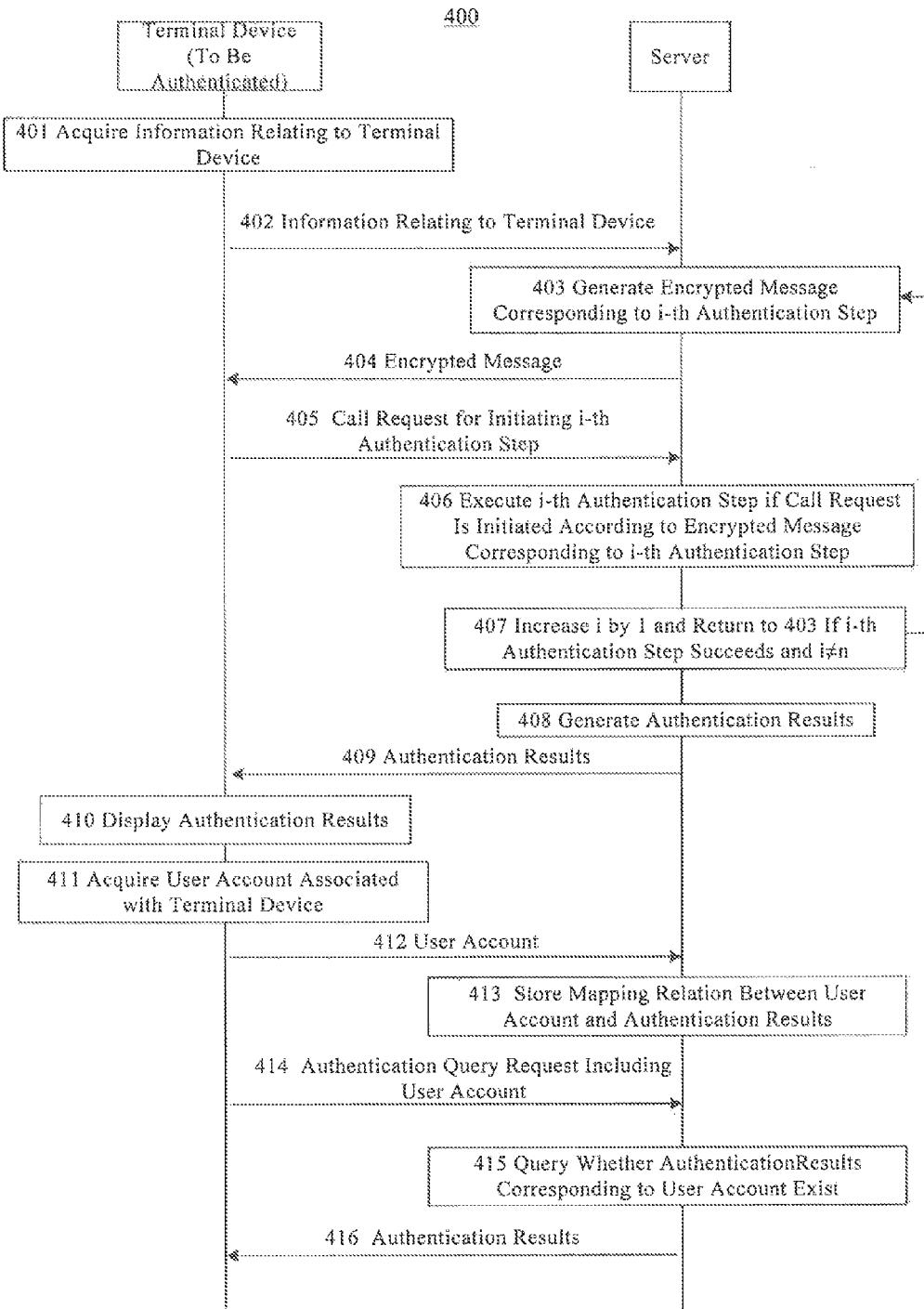
FIG. 4 is a flow diagram of an anti-counterfeiting authentication method, according to an exemplary embodiment.

FIG. 4 is a flow diagram of an anti-counterfeiting authentication method 400, according to an exemplary embodiment.

Referring to FIG. 4, the anti-counterfeiting authentication method 400 may include following steps.

In step 401, the terminal device to be authenticated may acquire information relating to the terminal device.

In some embodiments, a user may conduct an anti-counterfeiting authentication of the terminal device to be authenticated using a client application to communicate with a server. For example, a user may download and install a client application in the terminal device to be authenticated, or download and install a client application in other terminal equipment. When a client application is installed in other terminal equipment, the terminal equipment may be connected to the terminal device to be authenticated through, e.g., a USB data line, a wireless network or a wired network. In the exemplary embodiment presented in FIG. 4, the client application is installed in the terminal device to be authenticated.

The client application may acquire information relating to the terminal device to be authenticated. In some embodiments, the information may include a unique identification of the terminal device to be authenticated, such as an International Mobile Equipment Identity (IMEI) number.

In step 402, the terminal device to be authenticated sends the information relating to the terminal device to the server.

Correspondingly, the server receives the information sent from the terminal device to be authenticated.

In step 403, the server generates an encrypted message corresponding to an i-th authentication step.

For example, the i-th authentication step is an authentication step of n authentication steps arranged in a predetermined order for authenticating the terminal device, and $1 \leq i \leq n$. Also for example, a server may preset the n authentication steps to authenticate the terminal device, where the n authentication steps may be arranged differently corresponding to different options.

For example, if n=4, the predetermined order corresponding to authentication steps 1 to 4 may be set according to a single option: authentication step 1→authentication step 2→authentication step 3→authentication step 4.

As another example, if n=5, the predetermined order corresponding to authentication steps 1 to 5 may be set differently according to first and second options. The predetermined order according to the first option may be: authentication step 1→authentication step 2→authentication step 3→authentication step 4→authentication step 5. The predetermined order according to the second option may be: authentication step 1→authentication step 2→authentication step 4→authentication step 3→authentication step 5.

In addition, before the server executes any execution step for authentication of the terminal device, the authenticity of the client application running in the terminal device to be authenticated can be authenticated by an encrypted message, so as to prevent an counterfeit client application from initiating authentication steps not according to a predetermined order or skipping some authentication steps to acquire successful authentication results from the client application. In some embodiments, the server may generate an encrypted message by the following method.

For example, the server may encrypt an unencrypted message by using a private key, thereby generating the encrypted message corresponding to the i-th authentication step. In some embodiments, the unencrypted message may include the following implementations.

In a first implementation, when $1 \leq i \leq n$, the unencrypted message includes information relating to the terminal device to be authenticated and a step number corresponding to the i-th authentication step.

In a second possible implementation, when i=1, the unencrypted message includes information relating to the terminal device to be authenticated, and when $i \geq 2$, the unencrypted message includes information relating to the terminal device to be authenticated and a step number corresponding to an (i−1)-th authentication step which has been performed successfully.

In step 404, the server sends the encrypted message to the terminal device to be authenticated.

Correspondingly, the terminal device to be authenticated receives the encrypted message sent from the server.

In step 405, the terminal device to be authenticated sends a call request for initiating the i-th authentication step to the server, based on the encrypted message.

The step 405 may include the following substeps.

In a first substep, the terminal device generates a call request for initiating the i-th authentication step, where the call request includes the encrypted message corresponding to the i-th authentication step received from the server.

In a second substep, the terminal device sends the call request to the server.

Thus, after receiving the encrypted message, the terminal device may include the encrypted message in the call request to generate the call request for initiating the i-th authentication step, without having to process the encrypted message.

In addition, if the client application running in the terminal device is authentic, the client application may selectively and successively initiate n authentication steps according to the predetermined order. Different application programming interface (API) ports may be configured by the server in advance for different authentication steps. For example, the number of an API port corresponding to authentication step 1 may be set to 41, the number of an API port corresponding to authentication step 2 may be set to 42, and the number of an API port corresponding to authentication step 3 may be set to 43, etc. The client application may use different API ports provided by the server when sending to the server call requests for initiating different authentication steps. The server may also determine, based on the number of the API port used by the client side, the actual step number of the authentication step initiated by the client side.

Correspondingly, the server receives the call request from the terminal device to be authenticated for initiating the i-th authentication step.

In step 406, if the call request is initiated based on the encrypted message corresponding to the i-th authentication step, the server may execute the i-th authentication step.

Before executing the i-th authentication step, the server may verify whether the call request sent from the terminal device to be authenticated is initiated based on the encrypted message corresponding to the i-th authentication step, so as to determine the authenticity of the client application running in the terminal device to be authenticated.

The verification may include following substeps.

In a first substep, the server detects whether the call request includes the encrypted message corresponding to the i-th authentication step.

If the call request includes no encrypted message corresponding to the i-th authentication step, the server determines that this client application may be a counterfeit one. Under the circumstances, the server may directly generate an indication indicating an authentication failure.

In a second substep, the server retrieves the encrypted message in the encrypted message.

In a third substep, the server decrypts the encrypted message by using the private key.

Since the encrypted message is generated by the server by encrypting an unencrypted message using a private key, the encrypted message may be decrypted by the server. In other words, other application programs or equipment than the server should be unable to counterfeit or change the foregoing encrypted message, thus ensuring the reliability in authenticating the call request.

In some embodiments, if the call request includes the encrypted message but the server is unable to decrypt the encrypted message using the private key, the server may determine that this encrypted message is a counterfeit one. For example, it is possible that a counterfeit client application attempts to skip some authentication steps by counterfeiting step numbers included in an unencrypted message. Under the circumstances, the server may generate an indication of an authentication failure.

In a fourth substep, the server determines a step number corresponding to the i-th authentication step according to contents of the unencrypted message.

For example, once an unencrypted message is acquired by successfully decryption, the server may retrieve the step number corresponding to the i-th authentication step included in the unencrypted message. Alternatively, the server may retrieve the step number included in the unencrypted message corresponding to the (i−1)-th authentication step that is successfully executed, and determine the step number corresponding to the i-th authentication step based on the step number corresponding to the (i−1)-th authentication step and the predetermined order.

In a fifth substep, the server detects whether the actual step number initiated by the call request matches a step number corresponding to the i-th authentication step.

For example, the server may determine, according to the number of the API port used when the terminal device to be authenticated sends the call request, the actual step number initiated by the call request, and further compare the actual step number with the step number corresponding to the i-th authentication step determined after decryption, thereby detecting whether they match.

In a sixth substep, the server executes the i-th authentication step if the actual step number matches the step number corresponding to the i-th authentication step.

If the actual step number does not match the step number corresponding to the i-th authentication step, the server may generate an indication of authentication failure. In some embodiments, in order to further improve the reliability of authentication results, the server may include a timing message in an unencrypted message in generating the encrypted message. For example, the timing message may be configured to control the time at which the terminal device to be authenticated sends a call request. The timing message may be a timestamp corresponding to a time when the server generates an encrypted message, or a timestamp corresponding to a time when the server receives a latest call request.

Before the server executes the i-th authentication step, the following steps may be executed if the unencrypted message also includes a timing message.

In a first substep, the server retrieves the timing message included in the unencrypted message.

In a second substep, the server detects, based on the timing message, whether the time at which the call request is received is within a valid time frame.

In a third substep, the server executes the i-th authentication step if the call request is received within the valid time frame and the actual step number matches the step number corresponding to the i-th authentication step.

The server may not execute the i-th authentication step for authentication of the terminal device unless the detection result of the call request meets both of the conditions.

The i-th authentication step may include following different implementations.

In one embodiment, the terminal device to be authenticated may be authenticated by the server according to configuration parameters of the terminal device if the i-th authentication step is a configuration parameter authentication step.

For example, configuration parameters may include Central Processing Unit (CPU) serial number, Bluetooth serial number, sensor type, screen resolution, screen pixel density, and/or camera pixel. The server may compare configuration parameters of a terminal device to be authenticated with those of an authentic terminal device of the same model as the terminal device to be authenticated, thus determining whether the terminal device to be authenticated is an authentic product.

The terminal device to be authenticated may send configuration parameters along with a call request when sending the call request to the server, or send configuration parameters to the server before sending the call request to the server, or send configuration parameters to the server after sending the call request to the server.

In another embodiment, the terminal device to be authenticated may be authenticated by the server according to performance parameters of the terminal device if the i-th authentication step is a performance parameter authentication step.

For example, performance parameters may include charging time, conversation time, conversation quality, standby time, signal receiving capability, and/or signal receiving sensitivity. The server may compare performance parameters of a terminal device to be authenticated with those of an authentic terminal device of the same model as the terminal device to be authenticated, thus determining whether the terminal device to be authenticated is an authentic product.

The terminal device to be authenticated may send performance parameters along with a call request when sending the call request to the server, or send performance parameters to the server before sending the call request to the server, or send performance parameters to the server after sending the call request to the server.

In another embodiment, the terminal device to be authenticated is authenticated by the server according to basic information relating to the terminal device and an order database if the i-th authentication step is an order authentication step.

For example, the order database may include basic information relating to at least one terminal device. The basic information may include a unique identification of the terminal device, a CPU serial number, a Bluetooth serial number, a wireless LAN card address, a media access control (MAC) address, and/or a device serial number. The unique identification of the terminal device may be an IMEI number. In this embodiment, the i-th authentication step may include the following substeps.

In a first substep, the server may query whether the order database includes basic information matching basic information relating to the terminal device to be authenticated.

In a second substep, the server may determine the i-th authentication step to be successful if the order database includes basic information matching basic information relating to the terminal device to be authenticated.

Conversely, the server may determine the i-th authentication step to fail if the order database includes no basic information matching basic information relating to the terminal device to be authenticated. That is, the terminal device to be authenticated is deemed to be a counterfeit.

The terminal device to be authenticated may send basic information along with a call request when sending the call request to the server, or send basic information to the server before sending the call request to the server, or send basic information to the server after sending the call request to the server.

In another embodiment, the terminal device to be authenticated is authenticated by the server according to a geographical position corresponding to the terminal device and to a unique identification if the i-th authentication step is a geographical position authentication step.

For example, the geographical position corresponding to the terminal device to be authenticated may be sent from the terminal device to be authenticated to the server, or be acquired by the server according to an Internet Protocol (IP) address corresponding to the terminal device to be authenticated. The unique identification may be an IMEI number. In this embodiment, the i-th authentication step may include following substeps.

In a first substep, the server may detect whether the terminal device to be authenticated meets the predetermined condition.

In a second substep, the server may determine the i-th authentication step to be successful if the terminal device to be authenticated does not meet the predetermined condition.

For example, the predetermined condition may be receiving, within a scheduled time frame, a call request sent from a terminal device to be authenticated from different geographical positions but having the same unique identification of the terminal device to be authenticated. When call requests are sent to the server by terminal devices with the same unique identification from different geographical positions (the different geographical positions may be a plurality of geographical positions far away from one another, for example, different cities) within a short time frame, as one unique identification is only mapping to one terminal device, there is at most one authentic product in terminal devices to be authenticated in different geographical positions.

Thereafter, the server may send a prompt message to terminal devices to be authenticated in different geographical positions. The prompt message is configured to alert users that the terminal devices may be counterfeit products and may request users to conduct further authentication in an after-sales service center.

In step 407, if the i-th authentication step succeeds and i≠n, the server increases i by 1, i.e., i=i+1, and returns to step 403.

If the i-th authentication step succeeds and i≠n, the terminal device to be authenticated may be continued to be authenticated by the server in an (i+1)-th authentication step. The server updates i=i+1, executes the steps 403 to 406 again, and authenticates the terminal device in the (i+1)-th authentication step.

The process in which the server authenticates the terminal device in the (i+1)-th authentication step is the same as that in which the server authenticates the terminal device in the i-th authentication step described above in steps 403 to 406, and is not repeated herein.

In step 408, the server generates authentication results.

An indication of authentication failure may be sent to the terminal device to be authenticated if the i-th authentication step fails in authentication.

The authentication failure indication indicates that one or more of the configuration parameters, performance parameters, basic information or geographical position relating to the terminal device to be authenticated do not satisfy requirements for an authentic product.

An indication of authentication success may be sent to the terminal device to be authenticated if the i-th authentication step succeeds in authentication and i=n.

The authentication success indication indicates that the terminal device to be authenticated succeeds in authentication according to all n authentication steps, configuration parameters, performance parameters, basic information or geographical position relating to the terminal device to be authenticated and satisfies requirements for an authentic product.

In the method 400, if the terminal device to be authenticated is determined to be an authentic product, the terminal device to be authenticated may meet the following conditions.

First, both the terminal device to be authenticated and the server complete all n authentication steps in a predetermined order.

Second, in each authentication step, the terminal device to be authenticated succeeds in initiating the authentication step.

Third, in each authentication step, the terminal device to be authenticated succeeds in the authentication.

Otherwise, the terminal device to be authenticated may be considered to be a counterfeit product or suspected to be a counterfeit product.

In step 409, the server sends authentication results to the terminal device to be authenticated.

Correspondingly, the terminal device to be authenticated receives the authentication results sent from the server.

In step 410, the terminal device to be authenticated displays the authentication results, thereby informing the user whether the terminal device to be authenticated is an authentic product.

In step 411, the terminal device acquires a user account associated with the terminal device to be authenticated.

For example, the user account is an account created by the user in advance for logging in the server. Also for example, the user account may be a cloud service account. The terminal device to be authenticated and the user account may both belong to the user and have a mapping relationship between them.

In step 412, the terminal device to be authenticated sends the user account to the server.

For example, the user account may be sent initiatively by the terminal device to be authenticated to the server, or be sent to the server by the terminal device to be authenticated after receiving an account acquisition instruction sent from the server. Also for example, the server may send an account acquisition instruction to the terminal device if the terminal device succeeds in authentication according to all n authentication steps. That is, according to the authentication result, the terminal device to be authenticated is an authentic product.

Correspondingly, the server receives the user account sent from the terminal device to be authenticated.

In step 413, the server stores a mapping relation between the user account and the authentication results.

For example, a mapping relation between the user account and the authentication results may be stored by the server after generating the authentication results corresponding to the terminal device. In some embodiments, the server may also store various information relating to the terminal device corresponding to the user account, including for example, associated information, configuration parameters, performance parameters, basic information, unique identification, and/or authentication result of each authentication step.

In addition, the server may directly store a mapping relation between the user account and the authentication results in the terminal device, or store the mapping relation between the user account and the authentication results in other servers. For example, the server may store the mapping relation in a cloud server.

In step 414, the server receives an authentication query request including a user account from the terminal device.

For example, the server may store a mapping relation between the user account and the authentication results. A user may log in the server using a user account through an application program or a browser in any terminal device. In the meantime, the terminal device may send to the server an authentication query request including the user account.

In step 415, the server queries whether authentication results corresponding to the user account exist.

For example, after receiving an authentication query request including a user account, the server queries in the server whether an authentication result corresponding to the user account received is stored in the server.

The server may store no authentication result corresponding to the user account. Or authentication results of successful authentication corresponding to the user account exist in the server. It is also possible that authentication results of authentication failure corresponding to the user account exist in the server.

If an authentication result corresponding to the user account is stored in the server, this means that an interaction in the foregoing authentication step is conducted between the terminal device to be authenticated in association with the user account and the server. Further, when the authentication result is a successful authentication, this means that the terminal device to be authenticated in association with the user account is an authentic product. When the authentication result is an authentication failure, this means that the terminal device to be authenticated in association with the user account is a counterfeit product or suspected to be a counterfeit product.

If an authentication result corresponding to the user account is not stored in the server, this means that an interaction in the foregoing authentication step is not conducted between the terminal device to be authenticated in association with the user account and the server. For example, the user may have downloaded a counterfeit client application in previous authentication processes, and the counterfeit client application bypasses authentication steps of the server and directly feeds back to the user an authentication result showing that the terminal device is an authentic product.

In step 416, the server responds to the authentication query request by sending the authentication results to the terminal device if the authentication results are available.

After receiving a response corresponding to the authentication query request, the terminal device may provide the authentication result to the user. In some embodiments, the server may further feed back to the terminal device various information relating to the terminal device to be authenticated, including for example associated information, configuration parameters, performance parameters, basic information, unique identification, and/or authentication results of each authentication step.

In addition, if the terminal device does not receive a response corresponding to the authentication query request or receives a response indicating that no authentication result corresponding to the user account exists in the server, this means that the terminal device to be authenticated bypasses the foregoing authentication steps, and the terminal device to be authenticated is a counterfeit product. Under the circumstances, the terminal device may provide users with a prompt message indicating that the terminal device to be authenticated is a counterfeit product.

In some embodiments, the client application running in the terminal device to be authenticated may adopt Native C++ to compile authentication steps and perform reinforcement through reinforcement technologies, such as code encryption, code compression and the like, thus preventing simulating authentication steps by means of decompilation and the like, or uploading false parameters to the server.

Figure 5:
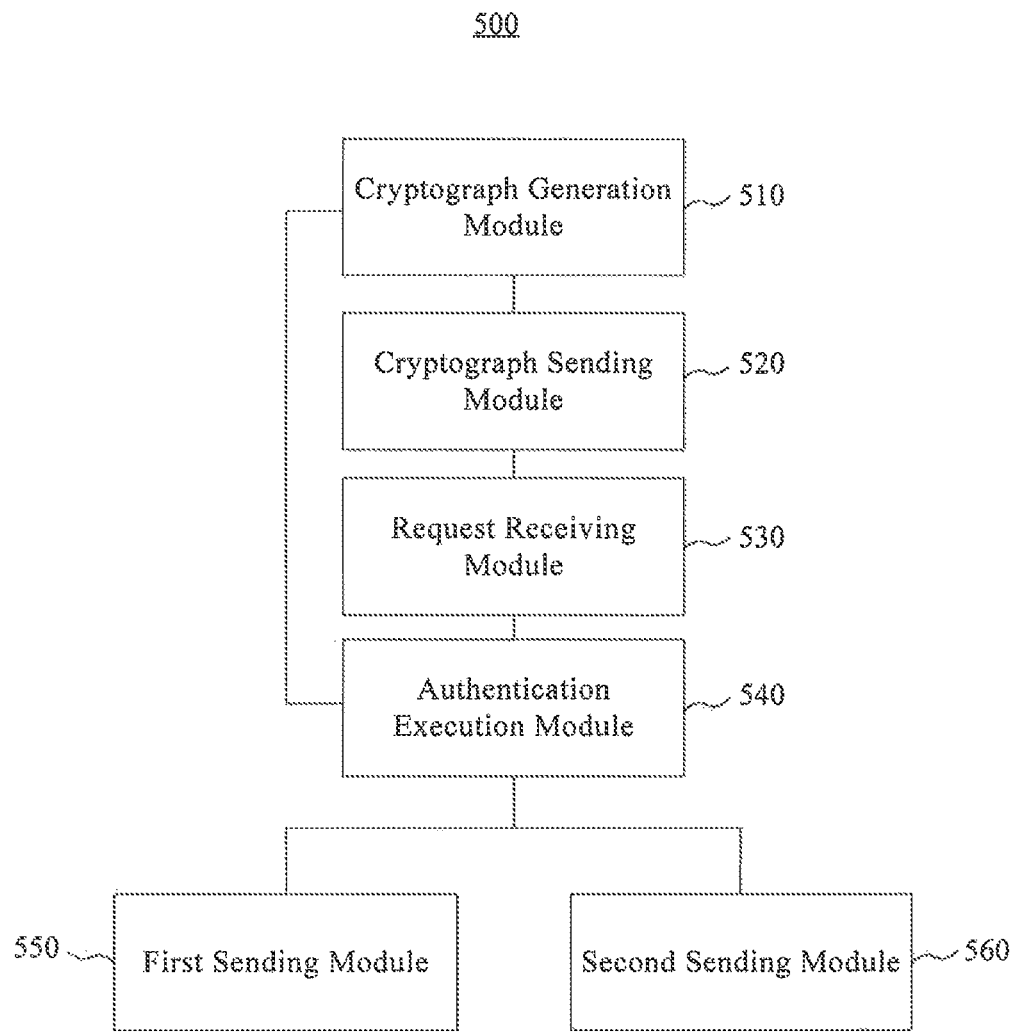
FIG. 5 is a block diagram of an anti-counterfeiting authentication device, according to an exemplary embodiment.

FIG. 5 is a block diagram of an anti-counterfeiting authentication device 500, according to an exemplary embodiment. The anti-counterfeiting authentication device 500 may be implemented to be a part or all of a server by means of software, or hardware, or a combination of both. Referring to FIG. 5, the anti-counterfeiting authentication device 500 may include a cryptograph generation module 510, a cryptograph sending module 520, a request receiving module 530, an authentication execution module 540, a first sending module 550, and a second sending module 560.

The cryptograph generation module 510 is configured to generate an encrypted message corresponding to an i-th authentication step, which is an authentication step among all n authentication steps arranged in a predetermined order for authenticating a terminal device, where $1 \leq i \leq n$.

The cryptograph sending module 520 is configured to send the encrypted message to the terminal device to be authenticated.

The request receiving module 530 is configured to receive a call request sent from the terminal device to be authenticated for initiating the i-th authentication step.

The authentication execution module 540 is configured to execute the i-th authentication step if the call request is a call request initiated according to an encrypted message corresponding to the i-th authentication step.

The cryptograph generation module 510 is also configured to increase i by 1, i.e., i=i+1, and execute the step of generating an encrypted message corresponding to the i-th authentication step when the i-th authentication step succeeds in authentication and $i \neq n$.

The first sending module 550 is configured to send an indication of authentication failure to the terminal device to be authenticated if the i-th authentication step fails in authentication.

The second sending module 560 is configured to send an indication of authentication failure success to the terminal device to be authenticated if the i-th authentication step succeeds in authentication and i=n.

Figure 6:
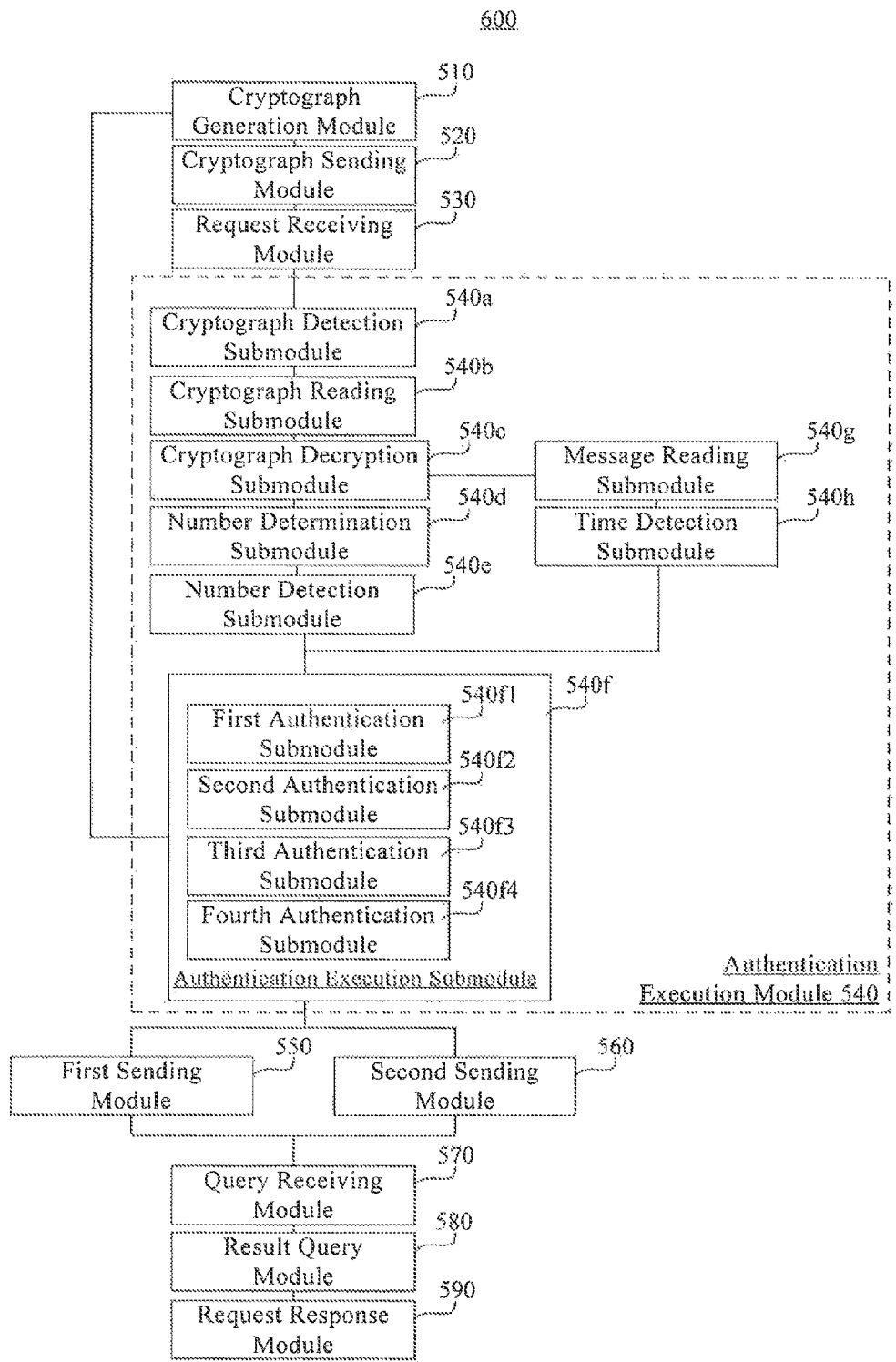
FIG. 6 is a block diagram of an anti-counterfeiting authentication device, according to an exemplary embodiment.

FIG. 6 is a block diagram of an anti-counterfeiting authentication device 600, according to another exemplary embodiment. The anti-counterfeiting authentication device 600 may be implemented to be a part or all of a server by means of software, or hardware, or a combination of both. Referring to FIG. 6, the anti-counterfeiting authentication device 600 may include a cryptograph generation module 510, a cryptograph sending module 520, a request receiving module 530, an authentication execution module 540, a first sending module 550, and a second sending module 560.

The cryptograph generation module 510 is configured to generate an encrypted message corresponding to an i-th authentication step, which is an authentication step among n authentication steps arranged in a predetermined order for authenticating a terminal device, where $1 \leq i \leq n$.

The cryptograph generation module 510 is also configured to encrypt an unencrypted message by using a private key and generate an encrypted message corresponding to the i-th authentication step.

When $1 \leq i \leq n$, the unencrypted message may include associated information relating to the terminal device to be authenticated and a step number corresponding to the i-th authentication step.

When i=1, the unencrypted message may include associated information relating to the terminal device to be authenticated. When $i \geq 2$, the unencrypted message may include associated information relating to the terminal device to be authenticated and a step number corresponding to an (i−1)-th authentication step which has been performed successfully.

The cryptograph sending module 520 is configured to send the encrypted message to the terminal device to be authenticated.

The request receiving module 530 is configured to receive a call request sent from the terminal device to be authenticated for initiating the i-th authentication step.

The authentication execution module 540 is configured to execute the i-th authentication step if the call request is initiated according to an encrypted message corresponding to the i-th authentication step.

The authentication execution module 540 includes a cryptograph detection submodule 540a, a cryptograph reading submodule 540b, a cryptograph decryption submodule 540c, a number determination submodule 540d, a number detection submodule 540e, and an authentication execution submodule 540f.

The cryptograph detection submodule 540a is configured to detect whether the call request includes the encrypted message corresponding to the i-th authentication step.

The cryptograph reading submodule 540b is configured to retrieve the encrypted message if the call request includes the encrypted message.

The cryptograph decryption submodule 540c is configured to decrypt the encrypted message by using the private key and acquire the unencrypted message.

The number determination submodule 540d is configured to determine a step number corresponding to the i-th authentication step according to contents of the unencrypted message.

The number detection submodule 540e is configured to detect whether an actual step number initiated by the call request matches a step number corresponding to the i-th authentication step.

The authentication execution submodule 540f is configured to execute the i-th authentication step if the actual step number matches a step number corresponding to the i-th authentication step.

In some embodiments, the authentication execution module 540 also includes a message reading submodule 540g and a time detection submodule 540h.

The message reading submodule 540g is configured to retrieve a timing message included in the unencrypted message if the unencrypted message also includes the timing message.

The time detection submodule 540h is configured to detect, according to the timing message, whether a time at which the call request is received is within a valid time frame.

The authentication execution submodule 540f is configured to execute the i-th authentication step if the time at which the call request is received is within the valid time frame and the actual step number matches the step number corresponding to the i-th authentication step.

The authentication execution submodule 540f includes a first authentication submodule 540/1, a second authentication submodule 540/2, a third authentication submodule 540/3, and/or a fourth authentication submodule 540/4.

The first authentication submodule 540/1 is configured to authenticate the terminal device according to configuration parameters of the terminal device, if the i-th authentication step is a configuration parameter authentication step.

The second authentication submodule 540/2 is configured to authenticate the terminal device according to performance parameters of the terminal device, if the i-th authentication step is a performance parameter authentication step.

The third authentication submodule 540/3 is configured to authenticate the terminal device according to basic information relating to the terminal device and an order database, if the i-th authentication step is an order authentication step. The order database includes basic information relating to at least one terminal device.

In some embodiments, the third authentication submodule 540/3 is also configured to query whether basic information matched with basic information relating to the terminal device to be authenticated in the order database, and to determine the i-th authentication step to be successful if the basic information is matched with basic information relating to the terminal device to be authenticated.

The fourth authentication submodule 540/4 is configured to authenticate the terminal device according to a geographical position corresponding to the terminal device and to a unique identification of the terminal device, if the i-th authentication step is a geographical position authentication step.

In some embodiments, the fourth authentication submodule 540/4 is also configured to detect whether the terminal device to be authenticated meets a predetermined condition. The predetermined condition includes receiving, within a scheduled time frame, a call request sent from the terminal device from different geographical positions but having the same unique identification of the terminal device to be authenticated. The fourth authentication submodule 540/4 is also configured to determine the i-th authentication step to be successful if the terminal device to be authenticated does not meet the predetermined condition.

The cryptograph generation module 510 is also configured to increase i by 1, i.e., i=i+1, and execute the step of generating an encrypted message corresponding to the i-th authentication step when the i-th authentication step succeeds and $i \neq n$.

The first sending module 550 is configured to send an indication of authentication failure to the terminal device to be authenticated if the i-th authentication step fails in authentication.

The second sending module 560 is configured to send an indication of authentication success to the terminal device to be authenticated if the i-th authentication step succeeds and i=n.

In some embodiments, the device 600 may include a query receiving module 570, a result query module 580, and a request response module 590.

The query receiving module 570 is configured to receive an authentication query request including a user account.

The result query module 580 is configured to query whether authentication results corresponding to the user account exist.

The request response module 590 is configured to respond to the authentication query request based on the authentication results if the authentication results exist.

Figure 7:
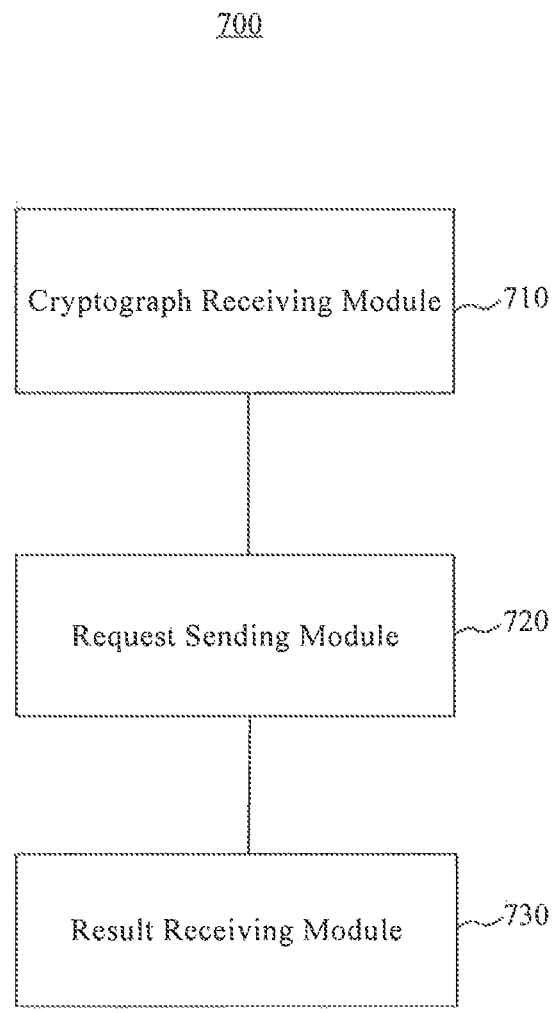
FIG. 7 is a block diagram of an anti-counterfeiting authentication device, according to an exemplary embodiment.

FIG. 7 is a block diagram of an anti-counterfeiting authentication device 700, according to an exemplary embodiment. The anti-counterfeiting authentication device 700 may be implemented to be a part or all of a terminal device to be authenticated or other terminal device equipment connected to the terminal device to be authenticated by means of software, or hardware, or a combination of both. Referring to FIG. 7, the anti-counterfeiting authentication device 700 may include a cryptograph receiving module 710, a request sending module 720, and a result receiving module 730.

The cryptograph receiving module 710 is configured to receive an encrypted message sent from the server and corresponding to an i-th authentication step, which is an authentication step of n authentication steps arranged in a predetermined order for authenticating a terminal device, where $1 \leq i \leq n$.

The request sending module 720 is configured to send to the server a call request for initiating the i-th authentication step according to the encrypted message.

The result receiving module 730 is configured to receive an indication of authentication failure or success sent from the server.

Figure 8:
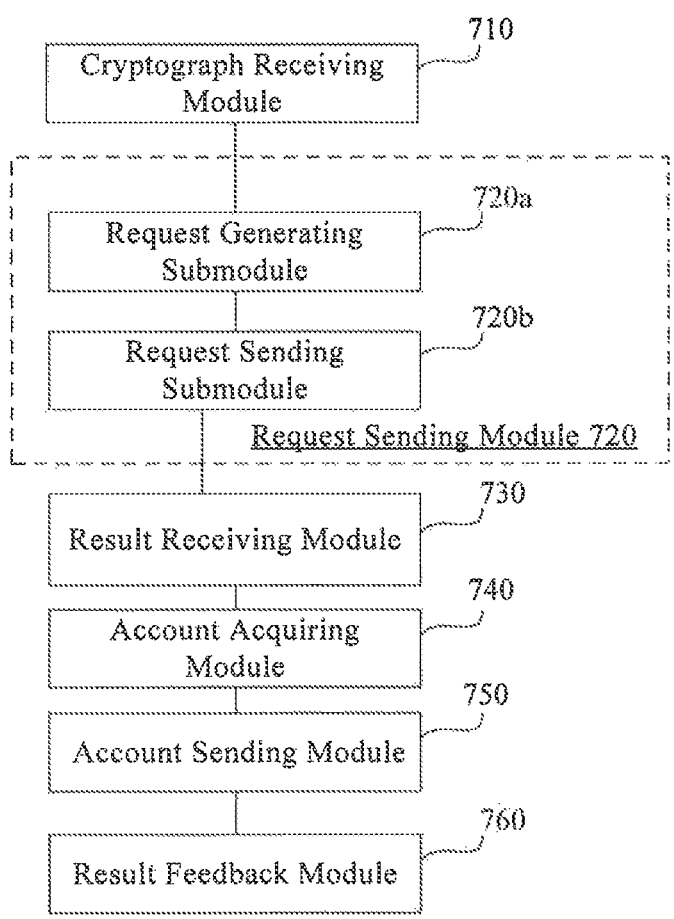
FIG. 8 is a block diagram of an anti-counterfeiting authentication device, according to an exemplary embodiment.

FIG. 8 is a block diagram of an anti-counterfeiting authentication device 800, according to an exemplary embodiment. The anti-counterfeiting authentication device 800 may be implemented to be a part or all of a terminal device to be authenticated or other terminal equipment connected to the terminal device to be authenticated by means of software, or hardware, or a combination of both. Referring to FIG. 8, the anti-counterfeiting authentication device 800 may include a cryptograph receiving module 710, a request sending module 720, and a result receiving module 730.

The cryptograph receiving module 710 is configured to receive an encrypted message sent from a server and corresponding to an i-th authentication step, which is an authentication step among n authentication steps arranged in a predetermined order for authenticating a terminal device, where $1 \leq i \leq n$.

The request sending module 720 is configured to send to the server a call request for initiating the i-th authentication step according to the encrypted message.

The request sending module 720 includes a request generating submodule 720a, and a request sending submodule 720b.

The request generation submodule 720a is configured to generate a call request for initiating the i-th authentication step, where the call request includes an encrypted message received from the server corresponding to the i-th authentication step.

The request sending submodule 720b is configured to send the call request to the server.

The encrypted message is generated by the server by encrypting an unencrypted message by using a private key.

In one exemplary embodiment, when $1 \leq i \leq n$, the unencrypted message includes information relating to the terminal device to be authenticated and a step number corresponding to the i-th authentication step.

In one exemplary embodiment, when i=1, the unencrypted message includes information relating to the terminal device to be authenticated. When $i \geq 2$, the unencrypted message includes information relating to the terminal device to be authenticated and a step number corresponding to an (i−1)-th authentication step which has been executed successfully.

The result receiving module 730 is configured to receive an indication indicating authentication failure or success sent from the server.

In some embodiments, the device 800 also includes an account acquiring module 740, an account sending module 750, and a result feedback module 760.

The account acquiring module 740 is configured to acquire a user account associated with the terminal device to be authenticated.

The account sending module 750 is configured to send the user account to the server.

The result feedback module 760 is configured to receive authentication results when the server succeeds in querying the authentication results corresponding to the user account.

Figure 9:
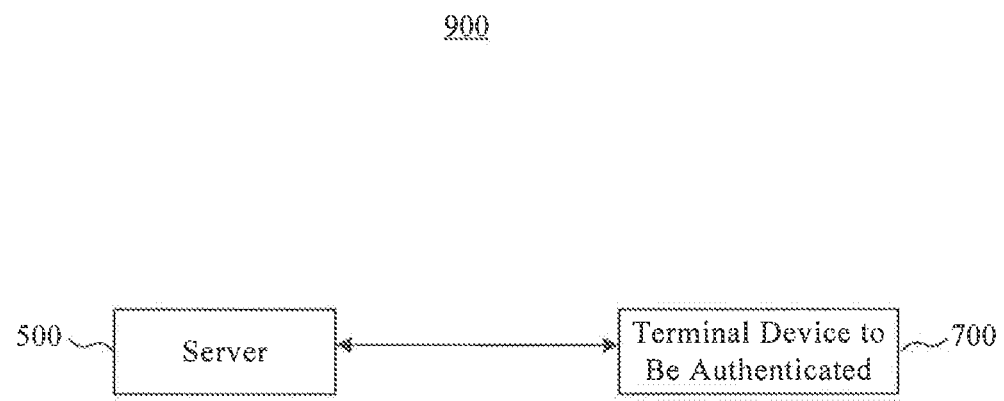
FIG. 9 is a block diagram of an anti-counterfeiting authentication system, according to an exemplary embodiment.

FIG. 9 is a block diagram showing an anti-counterfeiting authentication system 900, according to an exemplary embodiment. Referring to FIG. 9, the anti-counterfeiting authentication system 900 includes a server 500 and a terminal device 700 to be authenticated.

The server 500 may include an anti-counterfeiting authentication device which may be implemented to be a part or all of the server 500 by means of software, or hardware, or a combination of both. The anti-counterfeiting authentication device may be an anti-counterfeiting authentication device provided by embodiments as shown in FIG. 5 or FIG. 6.

The terminal device 700 to be authenticated is connected to the server 500 through a wired network or a wireless network.

The terminal device to be authenticated 700 may include an anti-counterfeiting authentication device which may be implemented to be a part or all of the terminal device to be authenticated 700 by means of software, or hardware, or a combination of both. The anti-counterfeiting authentication device may be an anti-counterfeiting authentication device provided by embodiments as shown in FIG. 7 or FIG. 8.

Figure 10:
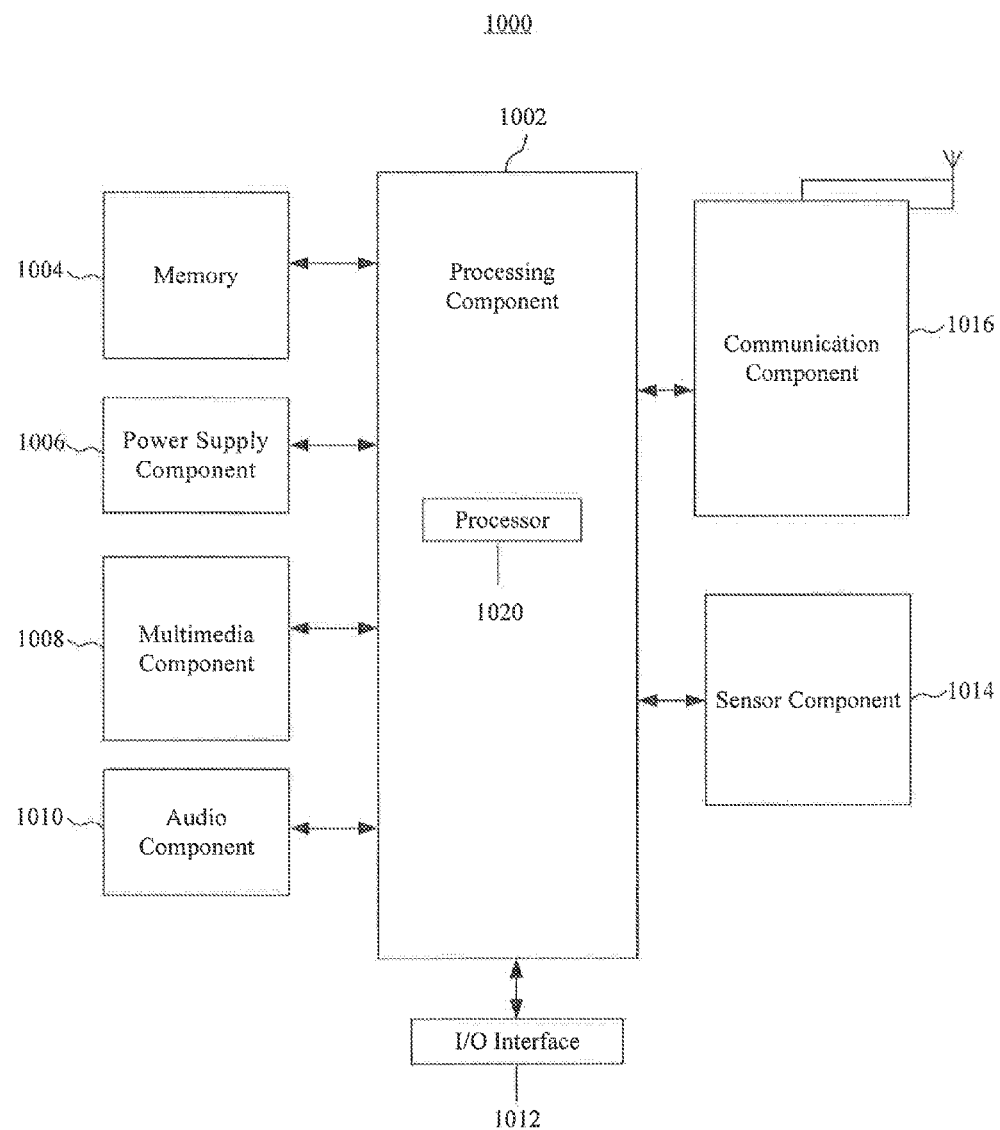
FIG. 10 is a block diagram of a terminal device, according to an exemplary embodiment.

FIG. 10 is a block diagram of a terminal device 1000 according to an exemplary embodiment. For example, the terminal device 1000 may be a mobile telephone, a computer, a digital broadcasting terminal, a message transceiver device, a games console, a tablet device, a medical device, a fitness facility, a personal digital assistant (PDA) and the like.

Referring to FIG. 10, the terminal device 1000 may include one or a plurality of components as below: a processor component 1002, a memory 1004, a power supply component 1006, a multimedia component 1008, an audio component 1010, an input/output (I/O) interface 1012, a sensor component 1014 and a communication component 1016. The person skilled in the art should appreciate that the structure of the terminal device 1000 as shown in FIG. 10 does not intend to limit the terminal device 1000. The terminal device 1000 may include more or less components or combine some components or other different components.

The processor component 1002 usually controls the overall operation of the device 1000, for example, display, telephone call, data communication, and operation associated with camera operation and record operation. The processor component 1002 may include one or a plurality of processors 1020 for executing instructions so as to complete steps of above method in part or in whole. In addition, the processor component 1002 may include one or a plurality of modules for the convenience of interaction between the processor component 1002 and other components. For example, the processor component 1002 may include a multimedia module for the convenience of interaction between the multimedia component 1008 and the processor component 1002.

The memory 1004 is configured to store data of different types so as to support the operation of the terminal device 1000. Examples of the data include any application program or approach directive for operation of the terminal device 1000, including contact data, phonebook data, message, picture and video, etc. The memory 1004 is also configured to store programs and modules. The processing component 1002 performs various functions and data processing by operating programs and modules stored in the memory 1004. The memory 1004 may be realized by volatile or non-volatile memory device of any type or combination thereof, for example, static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The power supply component 1006 is configured to provide power for components of the terminal device 1000. The power supply component 1006 may include a power management system, one or a plurality of power supplies, and other components associated with generation, management and power distribution of the terminal device 1000.

The multimedia component 1008 includes a screen between the terminal device 1000 and a user and for providing an output interface. In some embodiments, the screen may include a liquid crystal display (LCD) and/or a touch panel (TP). If the screen includes a touch panel, the screen may be realized as a touch screen for receiving input signal from users. The touch panel includes one or a plurality of touch sensors for sensing gestures on the touch panel, for example, touching and sliding, etc. The touch sensor not only can sensor trip boundary of touching or sliding, but also can detect the duration and pressure related to the touching or sliding operation. In some embodiments, the multimedia component 1008 includes a front-facing camera and/or a rear-facing camera. When the terminal device 1000 is under an operation mode, for example, capture mode or video mode, the front-facing camera and/or the rear-facing camera may receive external multimedia data. Each front-facing camera and rear-facing camera may be a fixed optical lens system or have focal length and optical zoom capacity.

The audio component 1010 is configured to output and/or input audio signal. For example, the audio component 1010 includes a microphone configured to receive an external audio signal when the terminal device 1000 is under an operation mode such as a call mode, a record mode and a speech recognition mode. The audio signal received may be further stored in the memory 1004 or sent out by the communication component 1016. In some embodiments, the audio component 1010 also includes a loudspeaker for outputting audio signal.

The I/O interface 1012 provides interface for the processor component 1002 and peripheral interface modules, the peripheral interface modules may be a keyboard, a click wheel and buttons, etc. These buttons may include but not limited to: home button, volume button, start button and locking button.

The sensor component 1014 includes one or a plurality of sensors for providing the device 1000 with state evaluation from all aspects. For example, the sensor component 1014 may detect the on/off state of the terminal device 1000, relative positioning of components, for example, the components are the displayer and keypads of the terminal device 1000; the sensor component 1014 also may detect the position change of the terminal device 1000 or a component thereof, the presence or absence of users' touch on the terminal device 1000, the direction or acceleration/deceleration of the terminal device 1000, and temperature variation of the terminal device 1000. The sensor component 1014 may also include a proximity detector, which is configured to detect the presence of nearby objects without any physical contact. The sensor component 1014 may also include an optical sensor, for example, CMOS or CCD image sensor for imaging. In some embodiments, the sensor component 1014 may also include an acceleration sensor, a gyro sensor, a magnetic sensor, a pressure sensor, or a temperature sensor.

The communication component 1016 is configured to facilitate wired communication or wireless communication between the terminal device 1000 and other equipment. The terminal device 1000 is available for access to wireless network based on communication standards, for example, WiFi, 2G or 3G, or combination thereof. In an exemplary embodiment, the communication component 1016 receives by means of a broadcast channel the broadcast signal or information from external broadcast management systems. In an exemplary embodiment, the communication component 1016 also includes a near field communication (NFC) module for promoting short-range communication. For example, the NFC module may be realized on the basis of Radio Frequency Identification (RFID) Technology, Infrared Data Association (IrDA) Technology, Ultra-wide Bandwidth (UWB) Technology, Bluetooth (BT) Technology and other technologies.

In exemplary embodiments, the device 1000 may be implemented with one or a plurality of application specific integrated circuits (ASIC), digital signal processors (DSP), digital signal processing equipment (DSPD), programmable logic devices (PLD), field programmable gate arrays (FPGA), controllers, microcontrollers, microprocessors or other electronic components, for performing the above described methods.

In exemplary embodiments, there is also provided a non-transitory computer-readable storage medium including instructions, such as included in the memory 1004 and executable by the processors 1020 of the terminal device 1000, for performing the above-described methods. For example, the non-transitory computer-readable storage medium may be a read-only memory (ROM), a random access memory (RAM), a CD-ROM, a magnetic tape, a floppy disk, an optical data storage device, etc.

Figure 11:
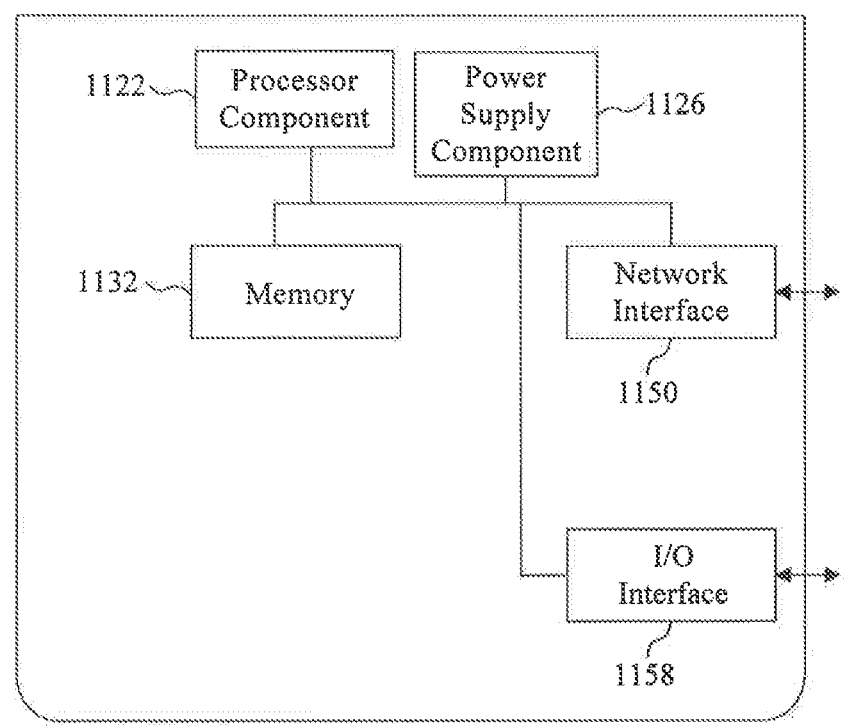
FIG. 11 is a block diagram of a device, according to an exemplary embodiment.

FIG. 11 is a block diagram of a device 1100, according to an exemplary embodiment. For example, the device 1100 may be provided as a server to perform the above described methods for anti-counterfeiting authentication. Referring to FIG. 11, the device 1100 includes a processor component 1122 that further includes one or more processors, and memory resource represented by the memory 1132 for storing instructions that can be executed by the processor component 1122, such as application programs. The application programs stored in the memory 1132 may include one or more modules each corresponding to a set of instructions. The device 1100 may also include a power supply module 1126 configured to perform power management of the device 1100, a wired or wireless network interface 1150 configured to connect the device 1100 to a network, and an input/output (I/O) interface 1158. The device 1100 may operate based on an operating system stored in the memory 1132, for example, Windows Server™, Mac OS X™, Unix™, Linux™, FreeBSD™ or the like.

It should be understood by those skilled in the art that the above described methods, devices, and modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It should be understood that the present disclosure is not limited to the exact construction that has been described above and illustrated in the accompanying drawings, and that various modifications and changes can be made without departing from the scope thereof. It is intended that the scope of the invention should only be limited by the appended claims.

What is claimed is:

1. An anti-counterfeiting authentication method implemented by a server, comprising:
   generating an encrypted message corresponding to an i-th authentication step, wherein the i-th authentication step is one of n authentication steps arranged in a predetermined order, and $1 \leq i \leq n$;
   sending the encrypted message to a terminal device to be authenticated;
   receiving, from the terminal device, a call request for initiating the i-th authentication step;
   executing the i-th authentication step if the request is initiated based on the encrypted message;
   if the i-th authentication step succeeds and i is less than n, increasing i by one and repeating the generating of an encrypted message;
   if the i-th authentication step fails, sending an indication to the terminal device indicating an authentication failure; and
   if the i-th authentication step succeeds and i equals to n, sending an indication to the terminal device indicating an authentication success.

2. The method according to claim 1, further comprising:
   encrypting an unencrypted message using a private key to generate the encrypted message corresponding to the i-th authentication step;
   wherein:
   when $1 \leq i \leq n$, the unencrypted message includes information relating to the terminal device and a step number corresponding to the i-th authentication step; or
   when i=1, the unencrypted message includes information relating to the terminal device, and when $i \geq 2$, the unencrypted message includes information relating to the terminal device and a step number corresponding to an (i−1)-th authentication step which has been successfully executed.

3. The method according to claim 2, further comprising:
   detecting whether the call request includes the encrypted message;
   retrieving the encrypted message based on the encrypted message;
   decrypting the encrypted message using the private key and acquiring the unencrypted message;
   determining the step number corresponding to the i-th authentication step based on contents of the unencrypted message;
   detecting whether a step number initiated by the call request matches the step number corresponding to the i-th authentication step; and
   executing the i-th authentication step if the step number initiated by the call request matches the step number corresponding to the i-th authentication step.

4. The method according to claim 3, further comprising:
   if the unencrypted message includes a timing message, retrieving the timing message based on the unencrypted message;
   detecting, according to the timing message, whether the call request is received within a valid time frame; and
   executing the i-th authentication step if the call request is received within the valid time frame and the step number initiated by the call request matches the step number corresponding to the i-th authentication step.

5. The method of claim 3, wherein executing the i-th authentication step comprises:
   authenticating the terminal device based on configuration parameters of the terminal device, if the i-th authentication step is a configuration parameter authentication step; or
   authenticating the terminal device based on performance parameters of the terminal device, if the i-th authentication step is a performance parameter authentication step; or
   authenticating the terminal device based on basic information relating to the terminal device and an order database, if the i-th authentication step is an order authentication step, the order database including basic information relating to at least one terminal device; or
   authenticating the terminal device based on a geographical position corresponding to the terminal device and a unique identification, if the i-th authentication step is a geographical position authentication step.

6. The method according to claim 5, wherein authenticating the terminal device based on basic information relating to the terminal device and an order database comprises:
   querying whether the order database includes basic information matching the basic information relating to the terminal device; and
   determining the i-th authentication step to be successful if the order database includes basic information matching the basic information relating to the terminal device.

7. The method according to claim 5, wherein authenticating the terminal device based on a geographical position corresponding to the terminal device and a unique identification comprises:
   detecting whether within a scheduled time frame, a plurality of call requests are received from terminal devices from different geographical positions having the same unique identification of the terminal device; and
   determining whether the i-th authentication step is successful based on the detecting.

8. The method according to claim 1, further comprising:
   receiving an authentication query request, the authentication query request including a user account;
   querying whether authentication results corresponding to the user account exist; and
   responding to the authentication query request based on the authentication results if the authentication results corresponding to the user account exist.

9. An anti-counterfeiting authentication method implemented by a terminal device to be authenticated, comprising:
   receiving, from a server, an encrypted message corresponding to an i-th authentication step, wherein the i-th authentication step is one of n authentication steps arranged in a predetermined order, and $1 \leq i \leq n$;
   sending, to the server, a call request for initiating the i-th authentication step, based on the encrypted message; and
   receiving, from the server, an indication indicating an authentication failure or an authentication success.

10. The method according to claim 9, further comprising:
    generating the call request for initiating the i-th authentication step, wherein the call request includes the encrypted message.

11. The method of claim 9, further comprising:
acquiring a user account associated with the terminal device;
sending the user account to the server; and
receiving authentication results from the server when the server succeeds in identifying the authentication results corresponding to the user account.

12. A server, comprising:
a processor; and
a memory for storing instructions executable by the processor;
wherein the processor is configured to:
generate an encrypted message corresponding to an i-th authentication step, wherein the i-th authentication step is one of n authentication steps arranged in a predetermined order, and $1 \leq i \leq n$;
send the encrypted message to a terminal device to be authenticated;
receive, from the terminal device, a call request for initiating the i-th authentication step;
execute the i-th authentication step if the call request is initiated based on the encrypted message;
if the i-th authentication step succeeds and i is less than n, increase i by one and repeat the generating of an encrypted message;
if the i-th authentication step fails, send an indication to the terminal device indicating an authentication failure; and
if the i-th authentication step succeeds and i equals to n, send an indication to the terminal device indicating an authentication success.

13. The server according to claim 12, wherein the processor is further configured to:
encrypt an unencrypted message using a private key to generate the encrypted message corresponding to the i-th authentication step;
wherein:
when $1 \leq i \leq n$, the unencrypted message includes information relating to the terminal device and a step number corresponding to the i-th authentication step; or
when i=1, the unencrypted message includes information relating to the terminal device, and when $i \geq 2$, the unencrypted message includes information relating to the terminal device and a step number corresponding to an (i−1)-th authentication step which has been successfully executed.

14. The server according to claim 13, wherein the processor is further configured to:
detect whether the call request includes the encrypted message;
retrieve the encrypted message based on the encrypted message;
decrypt the encrypted message using the private key and acquire the unencrypted message;
determine the step number corresponding to the i-th authentication step based on contents of the unencrypted message;
detect whether a step number initiated by the call request matches the step number corresponding to the i-th authentication step; and
execute the i-th authentication step if the step number initiated by the call request matches the step number corresponding to the i-th authentication step.

15. The server according to claim 14, wherein the processor is further configured to:
if the unencrypted message includes a timing message, retrieve the timing message based on the unencrypted message;
detect, according to the timing message, whether the call request is received within a valid time frame; and
execute the i-th authentication step if the call request is received within the valid time frame and the step number initiated by the call request matches the step number corresponding to the i-th authentication step.

16. The server of claim 14, wherein when executing the i-th authentication step, the processor is configured to:
authenticate the terminal device based on configuration parameters of the terminal device, if the i-th authentication step is a configuration parameter authentication step; or
authenticate the terminal device based on performance parameters of the terminal device, if the i-th authentication step is a performance parameter authentication step; or
authenticate the terminal device based on basic information relating to the terminal device and an order database, if the i-th authentication step is an order authentication step, the order database including basic information relating to at least one terminal device; or
authenticate the terminal device based on a geographical position corresponding to the terminal device and a unique identification, if the i-th authentication step is a geographical position authentication step.

17. The server according to claim 16, wherein when authenticating the terminal device based on basic information relating to the terminal device and an order database, the processor is configured to:
query whether the order database includes basic information matching basic information relating to the terminal device; and
determine the i-th authentication step to be successful if the order database includes basic information matching basic information relating to the terminal device.

18. A terminal device to be authenticated, comprising:
a processor; and
a memory for storing instructions executable by the processor;
wherein the processor is configured to:
receive, from a server, an encrypted message corresponding to an i-th authentication step, wherein the i-th authentication step is one of n authentication steps arranged in a predetermined order, and $1 \leq i \leq n$;
send, to the server, a call request for initiating the i-th authentication step, based on the encrypted message; and
receive, from the server, an indication indicating an authentication failure or an authentication success.

19. The terminal device according to claim 18, wherein the processor is further configured to:
generate a call request for initiating the i-th authentication step, wherein the call request includes the encrypted message.

20. The terminal device of claim 18, wherein the processor is further configured to:
acquire a user account associated with the terminal device;
send the user account to the server; and
receive authentication results from the server when the server succeeds in identifying the authentication results corresponding to the user account.

21. A non-transitory computer-readable storage medium having stored therein instructions that, when executed by a processor of a server, cause the server to perform an anti-counterfeiting authentication method comprising:

generating an encrypted message corresponding to an i-th authentication step, wherein the i-th authentication step is one of n authentication steps arranged in a predetermined order, and 1≤i≤n;

sending the encrypted message to a terminal device to be authenticated;

receiving a call request sent from the terminal device for initiating the i-th authentication step;

executing the i-th authentication step if the call request is initiated based on the encrypted message;

if the i-th authentication step succeeds and i is less than n, increasing i by one, and repeating the generating of an encrypted message;

if the i-th authentication step fails, sending an indication to the terminal device indicating an authentication failure; and if the i-th authentication step succeeds and i equals to n, sending an indication to the terminal device indicating an authentication success.

22. A non-transitory computer-readable storage medium having stored therein instructions that, when executed by a processor of a terminal device to be authenticated, cause the terminal device to perform an anti-counterfeiting authentication method comprising:

receiving, from a server, an encrypted message corresponding to an i-th authentication step, wherein the i-th authentication step is one of n authentication steps arranged in a predetermined order, and 1≤i≤n;

sending, to the server, a call request for initiating the i-th authentication step, based on the encrypted message; and receiving, from the server, an indication indicating an authentication failure or an authentication.

* * * * *